: US009094380B2

(12) United States Patent
Shinohara

(10) Patent No.: US 9,094,380 B2
(45) Date of Patent: Jul. 28, 2015

(54) PORTABLE TERMINAL APPARATUS, METHOD FOR CONTROLLING PORTABLE TERMINAL APPARATUS, COMMUNICATION SYSTEM, COMMUNICATION APPARATUS, AND METHOD FOR CONTROLLING COMMUNICATION APPARATUS

(75) Inventor: Masahito Shinohara, Tokyo (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 0 days.

(21) Appl. No.: 13/376,937

(22) PCT Filed: Jun. 3, 2010

(86) PCT No.: PCT/JP2010/059796
§ 371 (c)(1),
(2), (4) Date: Dec. 8, 2011

(87) PCT Pub. No.: WO2010/143669
PCT Pub. Date: Dec. 16, 2010

(65) Prior Publication Data
US 2012/0084397 A1    Apr. 5, 2012

(30) Foreign Application Priority Data
Jun. 8, 2009    (JP) .................................. 2009-137659

(51) Int. Cl.
*G06F 15/16*    (2006.01)
*H04L 29/08*    (2006.01)
(Continued)

(52) U.S. Cl.
CPC ............ *H04L 67/06* (2013.01); *H04L 29/0602* (2013.01); *H04M 2250/06* (2013.01); *H04W 28/14* (2013.01); *H04W 88/04* (2013.01)

(58) Field of Classification Search
CPC ..... H04W 88/06; H04W 48/18; G06Q 20/32; H04L 67/04

USPC .......................................... 709/217; 715/864
See application file for complete search history.

(56) References Cited

U.S. PATENT DOCUMENTS

2005/0009519 A1*    1/2005    Murai et al. ................ 455/432.2
2006/0031784 A1*    2/2006    Makela ......................... 715/850
(Continued)

FOREIGN PATENT DOCUMENTS

JP          6-208533 A    7/1994
JP           8-9053 A    1/1996
(Continued)

OTHER PUBLICATIONS

International Search Report for PCT/JP2010/059796 mailed Aug. 24, 2010.
(Continued)

*Primary Examiner* — Douglas W Owens
*Assistant Examiner* — Monica C King

(57) ABSTRACT

In order to solve the problem of performing data transmission between a server and a communication apparatus via a portable terminal apparatus at a high speed, the portable terminal apparatus is provided with: a first communication means which connects with a server on a network and communicates data, a second communication means which connects with the communication apparatus and performs data communication, a temporary storage means which temporarily stores data when relaying data communication between the server and the communication apparatus using the first communication means and the second communication means, and a control means which can control data communication performed by the first communication means and the second communication means asynchronously and in parallel when relaying data communication between the server and the communication apparatus.

16 Claims, 11 Drawing Sheets

(51) Int. Cl.
*H04L 29/06* (2006.01)
*H04W 28/14* (2009.01)
*H04W 88/04* (2009.01)

(56) References Cited

U.S. PATENT DOCUMENTS

| | | | |
|---|---|---|---|
| 2006/0183476 A1* | 8/2006 | Morita et al. | 455/435.2 |
| 2007/0197260 A1* | 8/2007 | Randall et al. | 455/557 |
| 2007/0213040 A1* | 9/2007 | Itou | 455/419 |
| 2008/0003982 A1* | 1/2008 | Gushiken | 455/411 |
| 2008/0069073 A1* | 3/2008 | Sano | 370/342 |
| 2008/0104687 A1* | 5/2008 | Fujiwara et al. | 726/10 |
| 2009/0180442 A1* | 7/2009 | Zhang et al. | 370/331 |

FOREIGN PATENT DOCUMENTS

| | | |
|---|---|---|
| JP | 10-285647 A | 10/1998 |
| JP | 200160907 A | 3/2001 |
| JP | 2001128242 A | 5/2001 |
| JP | 2001218277 A | 8/2001 |
| JP | 2003087363 A | 3/2003 |
| JP | 2004336256 A | 11/2004 |
| JP | 2005236362 A | 9/2005 |
| JP | 2006217382 A | 8/2006 |
| JP | 2006229331 A | 8/2006 |
| JP | 2007060515 A | 3/2007 |
| JP | 2007135154 A | 5/2007 |
| JP | 2007336335 A | 12/2007 |
| JP | 2008035469 A | 2/2008 |
| JP | 200885808 A | 4/2008 |
| JP | 2008281490 A | 11/2008 |
| JP | 2009538045 A | 10/2009 |
| KR | 10-2004-0074625 A | 8/2004 |
| KR | 10-2008-0035669 A | 4/2008 |

OTHER PUBLICATIONS

Korean Office Action for KR10-2012-7000149 dated on Feb. 28, 2013 with English Translation.
Communication dated Jun. 3, 2014 from the Japanese Patent Office in counterpart to Japanese application No. 2013-190070.

* cited by examiner

PORTABLE TERMINAL APPARATUS, METHOD FOR CONTROLLING PORTABLE TERMINAL APPARATUS, COMMUNICATION SYSTEM, COMMUNICATION APPARATUS, AND METHOD FOR CONTROLLING COMMUNICATION APPARATUS

TECHNICAL FIELD

The present invention relates to a communication system and in particular, relates to a portable terminal apparatus, a control method of the portable terminal apparatus, a communication system, a communication apparatus, and a control method of the communication apparatus for a communication apparatus to access a server via a portable terminal apparatus.

BACKGROUND ART

An example of a portable radio communication terminal having both of the portable telephone function and the wireless LAN (Local Area Network) function is disclosed in patent document 1. The portable radio communication terminal of patent document 1 has a means which selects either the portable telephone function or the wireless LAN function, and download and upload of personal information is performed via either a cellular phone base station or a wireless LAN base station. In patent document 1, a composition that the user sets a line to use in advance, and, a configuration of measuring a throughput when connecting to each line and a terminal automatically selects a line with good communication environment are disclosed.

Further, an example of a communication terminal apparatus having a local proxy is disclosed in patent document 2. The communication terminal apparatus disclosed in patent document 2, together with having a plurality of interfaces, for example, a cellular phone interface, a wireless LAN interface, and a wired LAN interface, has a local proxy which operates at a TCP (Transmission Control Protocol) layer. To the local proxy, an IP (Internet Protocol) address of each interface is assigned. Further, the local proxy establishes a link with two of these interfaces, and monitors. Further, the local proxy selects and connects with one of interface, temporarily storing in a memory, and relays downloading of applications such as a browser. Then, when the failure of a link in the selected interface is confirmed, the local proxy selects other interface and continues the process. That is, in patent document 2, a communication terminal apparatus in which, by using the local proxy, a cellular phone and LAN interface are switched while continuing the process between the browser and the local proxy and a plurality of links such as a cellular phone are switched seamlessly, is disclosed.

Further, a data communication system in which a mobile equipment which performs wireless communication by switching a plurality of communication systems receives data transmitted from a providing server, is disclosed in patent document 3. The data communication system disclosed in patent document 3, according to the radio wave intensity of each communication system and the order of priority, selects a communication system for use. The mobile equipment is used by the user of an external terminal. The mobile equipment and the external terminal, for example, can be connected by using near field communication such as Bluetooth (registered trademark) and infrared data communication. The mobile equipment, according to the instruction from an external terminal, establishes communication with a content server by the selected communication system, and transmits and receives two-way data. In the data communication system disclosed in patent document 3, when the download of contents is completed, end of communication is indicated to the mobile equipment from an external terminal, and the mobile equipment transmits an instruction for communication termination to a common authentication server. The common authentication server which received the instruction for communication termination, replies the acknowledgement response to the mobile equipment. Further, patent document 3 discloses that the acknowledgement response is acquired from the mobile equipment by an external terminal.

PRIOR ART DOCUMENT

Patent Document

[Patent document 1] Japanese Patent Application Laid-Open No. 2007-060515
[Patent document 2] Japanese Patent Application Laid-Open No. 2007-336335
[Patent document 3] Japanese Patent Application Laid-Open No. 2004-336256

DISCLOSURE OF THE INVENTION

Incidentally, in a portable terminal apparatus having routing functions of a wireless LAN communication and portable telephone communication, when a session is established between a communication apparatus and a server, the communication speed of the portable telephone communication may be slow compared with a wireless LAN communication. In such case, when the portable terminal apparatus tries to upload data received via the wireless LAN communication to a server by portable telephone communication, the upload speed is restricted by the rate of the portable telephone communication. As a result, even if a long period of time is necessary for uploading, until the upload is completed the user of the communication apparatus cannot perform the next process or even when moving to the next process, the process of the communication apparatus is heavy, and smooth operation may not be performed.

However, patent documents 1-3 do not disclose a means to solve the problem of having the possibility of not being able to perform a high speed data transmission when data which a portable terminal apparatus received by a wireless LAN communication is transmitted by a portable telephone communication.

An object of the present invention is to provide technology for solving the problem of having the possibility of not being able to perform a high speed data transmission when communication between an external communication apparatus and a server via a portable terminal apparatus is performed by each of the different communication interfaces which the portable terminal apparatus has.

Technical Solution

A terminal apparatus of the present invention includes a first communication means which connects to a server on a network and performs data transmission, a second communication means which connects to a communication apparatus and performs data transmission, a temporary storage means which temporarily stores data at the time of relaying a communication of data between the server and the communication apparatus using the first communication means and the second communication means, and a control means which can control the data communication of the first communication means and the second communication means asynchronously and in parallel at the time of relaying the communication of data between the server and the communication apparatus.

A communication apparatus of the present invention includes a communication means which connects to a server on a network via a portable terminal apparatus and performs communication, a request means which requests data communication with a server to the portable terminal apparatus, a control means which makes the portable terminal apparatus to have a data communication via the communication means, an inquiry means to inquire the communication state of the data communication with a server to the portable terminal apparatus, a reception means which receives the communication state from the portable terminal apparatus, and a presentation means which presents the communication state that the reception means received.

A control method of the terminal apparatus of the present invention is a control method of a portable terminal apparatus including a first communication unit which connects to a server on a network and performs data transmission, a second communication unit which connects to a communication apparatus and performs data transmission, and a temporary storage unit, includes temporarily storing data at the temporary storage unit at the time of relaying the communication of data between the server and the communication apparatus using the first communication unit and the second communication unit, and controlling the data communication of the first communication unit and the second communication unit asynchronously and in parallel at the time of relaying the communication of data between the server and the communication apparatus.

A control method of the communication apparatus of the present invention is a control method of the communication apparatus including a communication unit which connects to a server on the network via a portable terminal apparatus and performs communication, includes requesting data communication with a server to the portable terminal apparatus, making the portable terminal apparatus to have a data communication via the communication unit, inquiring the communication state of the data communication with a server to the portable terminal apparatus, receiving the communication state from the portable terminal apparatus, and presenting the received communication state.

A computer-readable recording medium of the present invention is a computer-readable recording medium which records a control program of a portable terminal apparatus, and records a control program of a portable terminal apparatus to make a computer of the portable terminal to carry out a first communication procedure of connecting to a server on a network and performing data transmission, a second communication procedure of connecting to a communication apparatus and performing data transmission, a temporary storage procedure of temporarily storing data at the temporary storage unit at the time of relaying the communication of data between the server and the communication apparatus in the first communication procedure and the second communication procedure, and a control procedure which makes possible control of the data communication in the first communication procedure and the second communication procedure asynchronously and in parallel at the time of relaying the communication of data between the server and the communication apparatus.

A computer-readable recording medium of the present invention is a computer-readable recording medium which records a control program of a communication apparatus, and records a control program of a communication apparatus to make a computer of the communication apparatus to carry out a communication procedure of connecting to a server on a network via a portable terminal apparatus and performing communication, a request procedure of requesting data transmission with a server to the portable terminal apparatus, a control procedure of making the portable terminal apparatus to carry out data communication in the communication procedure, an inquiry procedure of inquiring the communication state of the data communication with a server to the portable terminal apparatus, a reception procedure of receiving the communication state from the portable terminal apparatus, and a presentation procedure of presenting the received communication state.

Advantageous Effect of the Invention

The present invention has the effect of making possible data transmission between a server and a communication apparatus via a portable terminal apparatus at a high speed.

BEST MODE FOR CARRYING OUT THE INVENTION

Figure 1:
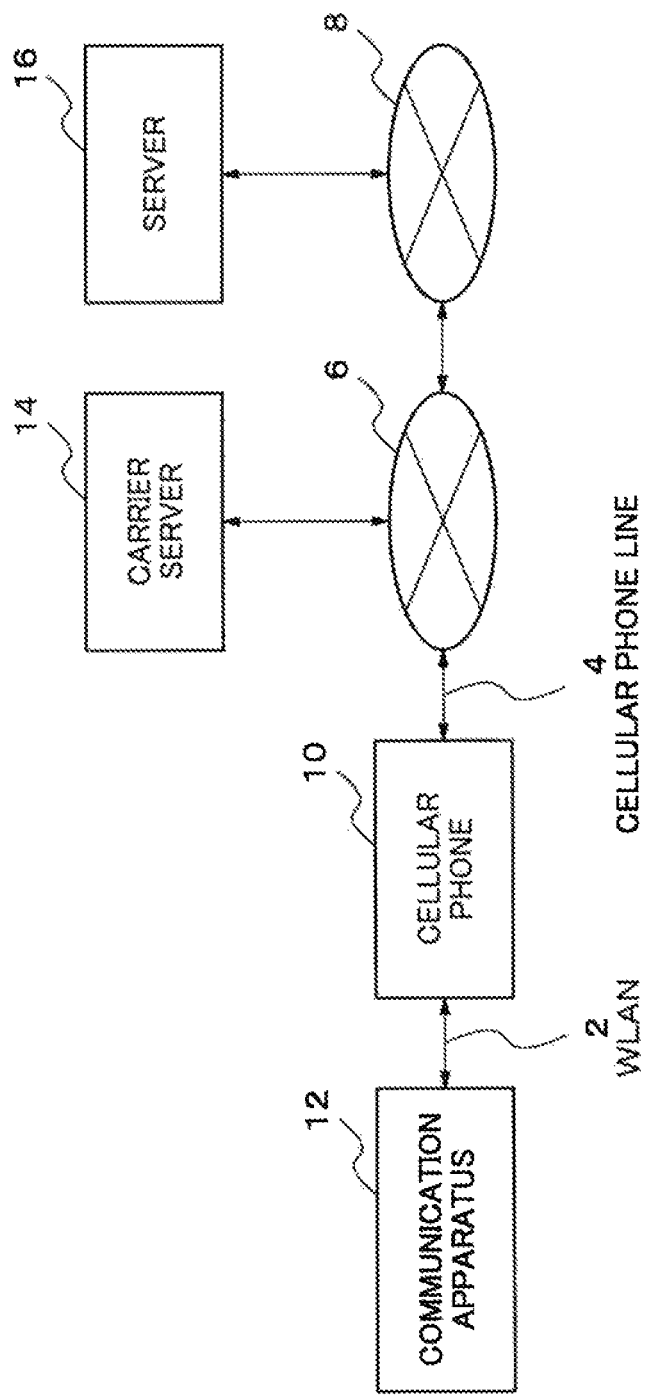
FIG. 1 It is a diagram showing a composition of a communication system according to an exemplary embodiment of the present invention.

Hereinafter, the exemplary embodiment of the present invention will be described by referring to the drawings. Further, in all drawings, like reference numerals are given to like elements, and the explanation is omitted appropriately.

FIG. 1 is a figure showing a composition of a communication system according to an exemplary embodiment of the present invention.

The communication system of the present exemplary embodiment includes a cellular phone 10, a communicaapparatus 12, a carrier server 14, and a server 16. The communication apparatus 12 is connected to the cellular phone 10 via a wireless LAN (in the figure, indicated as "WLAN" (Wireless LAN)) 2. The carrier server 14 is on a cellular phone network 6, and it is connected to the cellular phone 10 via a cellular phone line 4. The server 16 is a server on the network such as an internet 8 connected via the cellular phone 10 and the cellular phone network 6.

The user, for example, is assumed to carry the communication apparatus 12 and the cellular phone 10 together. The user accesses the server 16 using the communication apparatus 12 via the cellular phone 10. The cellular phone 10 has two different communication interfaces. Communication interfaces hereof includes interface which connects with the communication apparatus 12 and interface which connects with the server 16 on the internet 8 via the cellular phone network 6. The communication apparatus 12 and the cellular phone 10, communicates using the wireless LAN 2. The cellular phone 10 and the server 16 are connected via the cellular phone line, the cellular phone network 6, and the internet 8, and they communicate. The two communication interfaces can communicate asynchronously and in parallel independently. In the present exemplary embodiment, the two communication interfaces have different communication speed, and the wireless LAN 2 can communicate in the faster speed than the cellular phone line 4. However, the magnitude relation of the speed of the wireless LAN 2 and the cellular phone line 4 is not limited to the present exemplary embodiment. Further, in a connection to the server 16 via the cellular phone line 4, the communication state tends to change by a communication environment, and the communication quality may be poor. In the present exemplary embodiment, the user can operate as if the communication apparatus 12 is directly accessed to the server 16 without being conscious of the existence of the cellular phone 10.

Further, in each of the following figure, a partial configuration which is not related to the essence of the present exemplary embodiment is omitted, for example, a call function process unit which is the composition of the cellular phone 10 is not illustrated.

Further, each component element of the communication system of the present exemplary embodiment is realized by an optional combination of a hardware and a software with a focus on CPU, a memory, a program, a storage unit such as a hard disk which stores a program, and an interface for network connections. The CPU realizes the function of each component element of the communication system of the present exemplary embodiment by carrying out a program loaded in a memory. Further, it is understood by a person skilled in the art that there are various modifications to an implementation method and to an apparatus. Each figure described hereinafter indicates a block of function unit, not a composition of hardware unit.

According to the present exemplary embodiment, as a portable terminal apparatus, although the explanation is given using the cellular phone 10 for an example, it is not limited hereto, and a portable terminal apparatus need only to have two different communication interfaces each of which operates independently, for example, a so-called mobile router or the like not having the call functions may be used.

Figure 2:
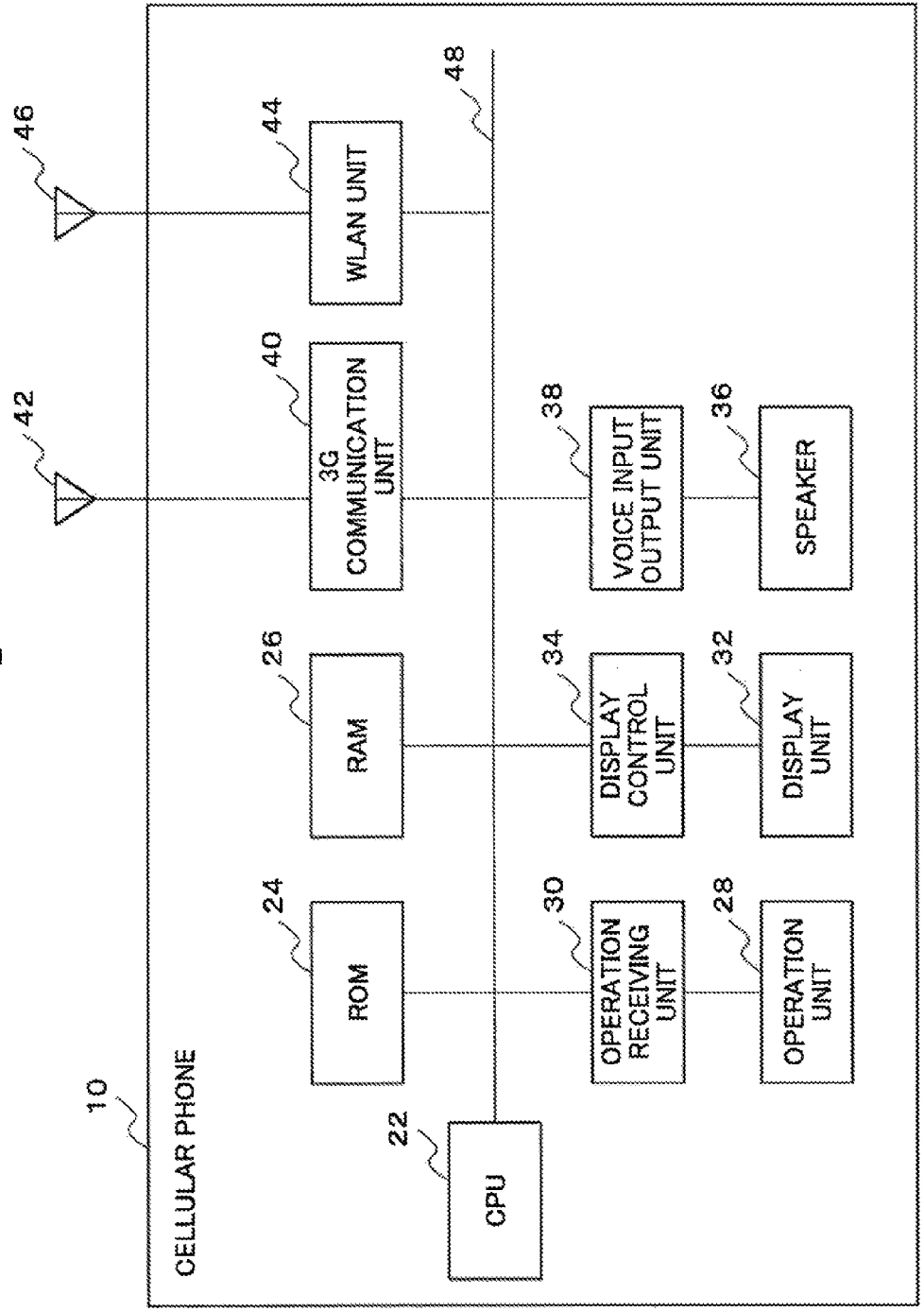
FIG. 2 It is a block diagram showing a hardware configuration of a cellular phone of the communication system of the present exemplary embodiment.

FIG. 2 is a block diagram showing a hardware configuration of a cellular phone 10 of FIG. 1.

As shown in FIG. 2, the cellular phone 10 of the present exemplary embodiment includes a CPU (Central Processing Unit) 22, a ROM (Read Only Memory) 24, a RAM (Random Access Memory) 26, an operation unit 28, an operation receiving unit 30, and a display unit 32. Further, the cellular phone 10 of the present exemplary embodiment includes a display control unit 34, a speaker 36, a voice input output unit 38, a 3G (3rd Generation) communication unit 40, an antenna 42 for 3G communications, a wireless LAN (in the figure, indicated as "WLAN") unit 44, and an antenna 46 for wireless LANs.

The CPU 22 is connected to each component of the cellular phone 10 via a bus 48 and controls the entire cellular phone 10 as well as each component. The ROM 24 stores a program for operating the cellular phone 10 and various setting data for using when operating the program. Further, the ROM 24 stores user data including various data such as a mail associated data including sent and received mail and setting information, an address book, an image data including moving images, a musical (such as music, melody, and sound) data, and an application data. The RAM 26 has context area for a program to operate and an area to temporarily store a data such as a buffer on a sent and received mail. Further, the cellular phone 10 may have an access unit which reads and writes a recording medium which is not illustrated, and can record various user data in the recording medium.

As for the operation unit 28, either one of an operation key, an operation button, a switch, a Jog dial, a touch pad, and a mouse is used. However, a specific composition of the operation unit 28 is not limited hereto. The operation receiving unit 30 receives operation of the operation unit 28 by the user and notifies the CPU 22. As for the display unit 32, either one of an LED (Light Emitting Diode) indicator, a liquid crystal display and an organic EL (Electro Luminescence) display is used. However, a specific composition of the display unit 32 is not limited hereto. The display control unit 34, by following to the instructions from the CPU 22, performs various screen displays in the display unit 32. The voice input output unit 38, by following to the instructions from the CPU 22, performs a voice output from the speaker 36 and performs voice input from a microphone which is not illustrated.

The 3G communication unit 40, via the antenna 42 for 3G communications, connects with the cellular phone line 4 via a base station (not shown) with wireless LAN, and communicates with the carrier server 14 on the cellular phone network 6. The wireless LAN unit 44 connects with the communication apparatus 12 via the antenna 46 for wireless LANs with wireless LAN, and communicates. The 3G communication unit 40 connects with the carrier server 14 and connects with the internet 8 via the carrier server 14, and can access to the server 16.

For example, the communication apparatus 12 of the present exemplary embodiment is an electronic device such as a camera, a game machine, a mobile PC, and PDA (Personal Digital Assistants). The present exemplary embodiment will be described using a camera as an example.

According to the present exemplary embodiment, the communication apparatus 12, via the cellular phone 10, uploads data to the server 16 on the internet 8. In this case, for example, the user may have the cellular phone 10 in a bag the user is carrying or in a pocket of clothes. Then, the user, without being conscious of the existence of the cellular phone 10, can operate the communication apparatus 12 and upload image data or the like to the server 16.

Or more specifically, the communication apparatus 12 can access the server 16 via the cellular phone 10 and download update firmware of the communication apparatus 12, various application programs, other data for example picture frame data or the like from the server 16. That is, the communication apparatus 12, using the wireless LAN function, can connect to the cellular phone 10 and communicate with the server 16 via the cellular phone network 6. The types and the contents of data sent and received between the communication apparatus 12 and the server 16 are not limited in particular.

The carrier server 14 is a server of each carrier company which provides a communication service of the cellular phone 10. The cellular phone 10 can be connected to the internet 8 via the carrier server 14. The communication apparatus 12 does not need to be conscious of the existence of the carrier server 14. Hereinafter, in order to simplify the explanation, when the cellular phone 10 connects to the internet 8, the description on the route to the cellular phone network 6 and the carrier server 14 will be omitted.

The server 16, for example, is a Web server including a website of a manufacturer of the communication apparatus 12 and a website which the user designated arbitrarily or an FTP (File Transfer Protocol) server. The communication apparatus 12, via the cellular phone 10, can designate information on URL (Uniform Resource Locator) of any website or an address of a connection destination of an FTP server and connect to them. According to the present exemplary embodiment, while the server 16 on the internet 8 is used as a server of a connection destination of the communication apparatus 12, the server is not limited hereto. A server on other networks such as an intranet may be used.

Figure 3:
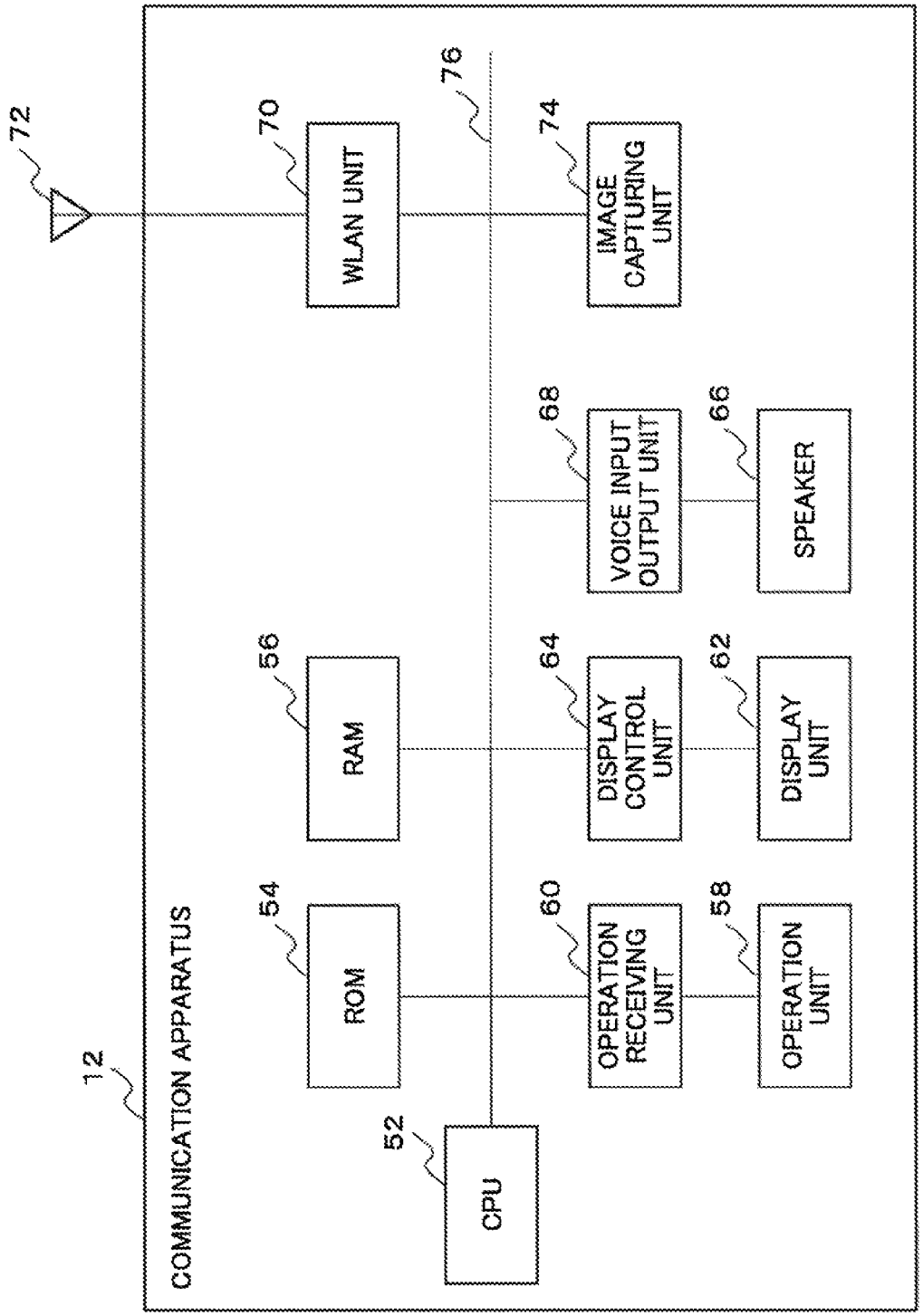
FIG. 3 It is a block diagram showing a hardware configuration of a communication apparatus of the communication system of the present exemplary embodiment.

FIG. 3 is a block diagram showing a hardware configuration of the communication apparatus 12 of FIG. 1.

As shown in FIG. 3, the communication apparatus 12 of the present exemplary embodiment includes a CPU (Central Processing Unit) 52, a ROM (Read Only Memory) 54, a RAM (Random Access Memory) 56, an operation unit 58, and an operation receiving unit 60. The communication apparatus 12 further includes a display unit 62, a display control unit 64, a speaker 66, a voice input output unit 68, a wireless LAN (in the figure, indicated as "WLAN") unit 70, an antenna 72 for wireless LANs, and an image capturing unit 74.

The CPU 52 is connected via each component and a bus 76 of the communication apparatus 12 and controls the entire communication apparatus 12 as well as each component. The ROM 54 stores a program for operating the communication apparatus 12 and various setting data used when operating the program, and stores image data including such as still images and moving images captured at the image capturing unit 74. The RAM 56 has working area for a program to operate and an area such as a buffer on a sent data to temporarily store a data. Further, the communication apparatus 12 may have an access unit which reads and writes a recording medium which is not illustrated, and can record image user data in the recording medium.

As for the operation unit 58, either one of an operation key, an operation button, a switch, a Jog dial, a touch pad, and a mouse is used. However, a specific composition of the operation unit 58 is not limited hereto. The operation receiving unit 60 receives operation of the operation unit 58 by the user and notifies the CPU 52. As for the display unit 62, either one of an LED indicator, a liquid crystal display and an organic EL display is used. However, a specific composition of the display unit 62 is not limited hereto. The display control unit 64, following to the instructions from the CPU 52, performs various screen displays in the display unit 62. Here, by using a pointing device such as a mouse as the operation unit 58, the button displayed on the display unit 62 may be operated by using a pointing device. The voice input output unit 68, following to the instructions from the CPU 52, performs a voice output from the speaker 66 and performs voice input from a microphone which is not illustrated.

The wireless LAN unit 70 connects with the cellular phone 10 by wireless communication via the antenna 72 for wireless LANs and communicates. The image capturing unit 74 captures image data or the like including a still image and a moving image. Captured image data is stored in the RAM 56 or a recording medium which is not illustrated.

Figure 4:
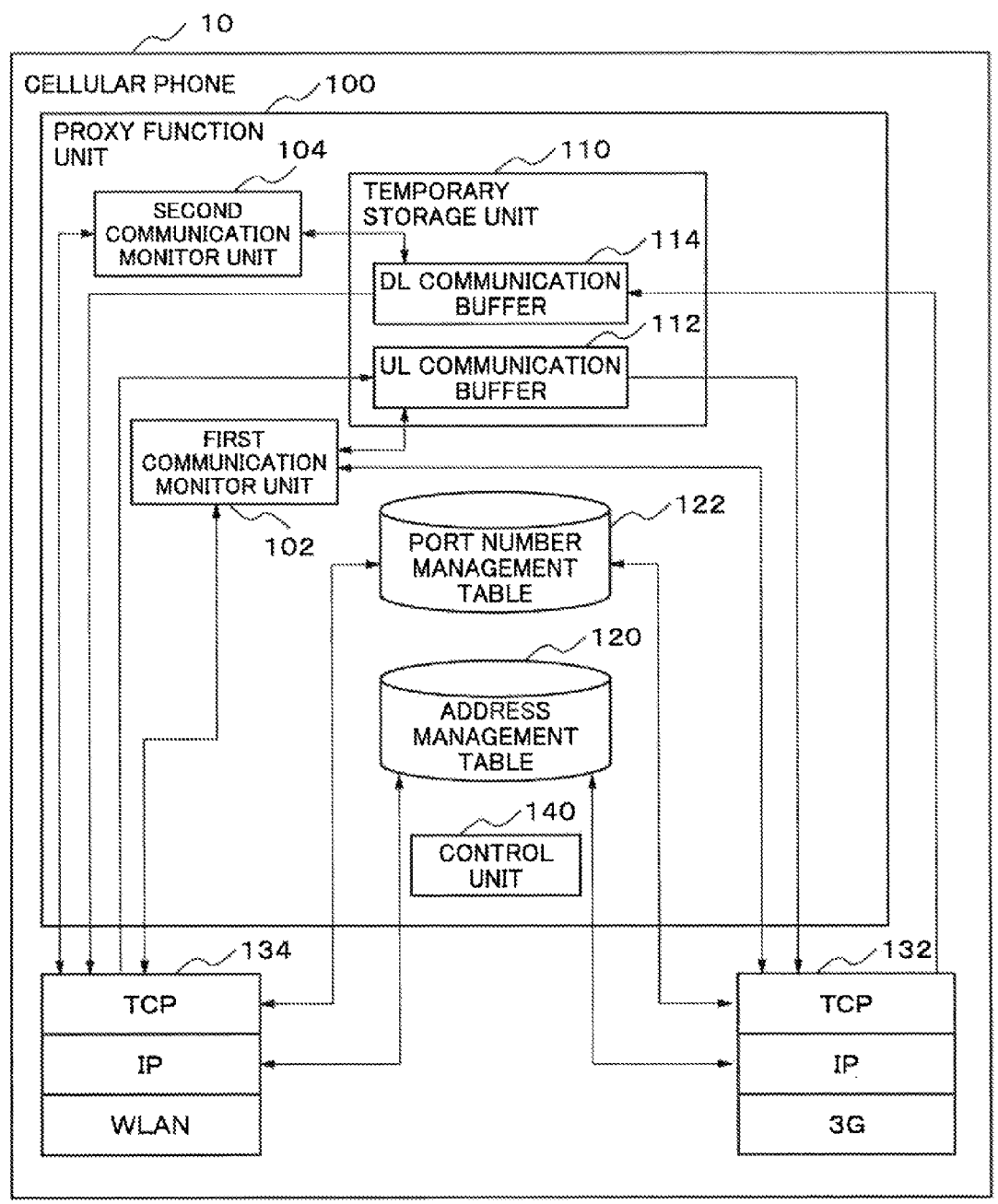
FIG. 4 It is a functional block diagram showing a main section composition of the cellular phone of the communication system of the present exemplary embodiment.

FIG. 4 is a functional block diagram showing a main section composition of the cellular phone 10 of the communication system of the present exemplary embodiment. The CPU 22 of FIG. 2, by writing or writing data to or from the ROM 24 and the RAM 26 according to the program, further by sending and receiving a stored data to and from hardware blocks via the bus 48, realizes the function of a proxy function unit 100 shown in FIG. 4.

The cellular phone 10 of the present exemplary embodiment includes a first communication unit (a 3G communication unit 132), a second communication unit (a wireless LAN communication unit 134), a temporary storage unit 110, and a control unit 140. The first communication unit (the 3G communication unit 132) connects with the server 16 (FIG. 1) on the network (the internet 8 of FIG. 1) and performs data communication. The second communication unit (the wireless LAN communication unit 134) connects with the communication apparatus 12 (FIG. 1) and performs data communication. The temporary storage unit 110, when relaying communication of data between the server 16 and the communication apparatus 12 by using the 3G communication unit 132 and the wireless LAN communication unit 134, temporarily stores data. The control unit 140, when the cellular phone 10 relays communication of data between the server 16 and the communication apparatus 12, controls data communication of the 3G communication unit 132 and the wireless LAN communication unit 134 asynchronously and in parallel.

Specifically, the cellular phone 10 of the present exemplary embodiment has the proxy function unit 100, a 3G communication unit 132 and a wireless LAN communication unit 134. Further, the proxy function unit 100 includes a first communication monitor unit 102, a second communication monitor unit 104 and the temporary storage unit 110 having an UL (Up Load) communication buffer 112 and a DL (Down Load) communication buffer 114. Further, the proxy function unit 100 includes an address management table 120, a port number management table 122, and a control unit 140. Further, a line which indicates control of the control unit 140 with each unit and a flow of data is omitted in the figure.

The temporary storage unit 110, the address management table 120, and the port number management table 122 can be included in the RAM 26 of FIG. 2. The UL communication buffer 112 is a buffer which temporarily stores data for uplinks to the server 16. The DL communication buffer 114 is a buffer which temporarily stores data for down links from the server 16.

The address management table 120 manages a corresponding relationship of an IP address in the wireless LAN side and the 3G side. The port number management table 122 manages a corresponding relationship of the port number of the wireless LAN side and the 3G side. In the present exemplary embodiment, an IP address on the wireless LAN side of the cellular phone 10 is made as 192.168.0.254, and an IP address on the 3G side is made as 10.0.0.254. An IP address of the carrier server 14 is also stored in the address management table 120. For the carrier server 14, the description will be omitted.

Further, according to the present exemplary embodiment, an IP address of the communication apparatus 12 is made as 192.168.0.1, and the port number of the port for data transmission is 1024, and the port number for the inquiry of the data transmission state and reply reception is made as 1025. The port number of the server 16 is made as 80. The port number of the wireless LAN side of the cellular phone 10 is 8080, and the port number of the 3G side is made as 2001.

The 3G communication unit 132 connects with the cellular phone line 4 and communicates with the carrier server 14 on the cellular phone network 6. The 3G communication unit 132 corresponds to the 3G communication unit 40 and the antenna 42 for 3G communications of FIG. 2. The wireless LAN communication unit 134 performs wireless communication with the communication apparatus 12. The wireless LAN communication unit 134 corresponds to the wireless LAN unit 44 and the antenna 46 for wireless LANs of FIG. 2.

In the present exemplary embodiment, the cellular phone 10 has two different communication units of the 3G communication unit 132 and the wireless LAN communication unit 134. Here, compared with the communication speed of the 3G communication unit 132, the communication speed of the wireless LAN communication unit 134 is faster. Accordingly, in the cellular phone 10, when transmitting image data received in the wireless LAN communication unit 134 from the communication apparatus 12 to the server 16 in the 3G communication unit 132, image data will temporarily stop at the cellular phone 10 only for the difference of the communication speed. In the cellular phone 10, in parallel with temporarily storing the image data received at a high speed in the wireless LAN communication unit 134 from the communication apparatus 12, it will be sequentially transmitted according to the communication speed of the 3G communication unit 132 side.

In the cellular phone 10 of the present exemplary embodiment, the control unit 140 temporarily stores at least one part of the data received by either of the 3G communication unit 132 and the wireless LAN communication unit 134 in the temporary storage unit 110. Then, the control unit 140, in parallel with continuing the reception of data, transmits data temporarily stored in the temporary storage unit 110 by the 3G communication unit 132 or the wireless LAN communication unit 134 on the other side.

The uploaded data on the uplink side is temporarily stored in the UL communication buffer 112 of the proxy function unit 100 via WLAN, an IP layer and a TCP layer in a protocol stack of the wireless LAN communication unit 134. The UL communication buffer is in a FIFO (First-In First-Out) type, and the uploaded data temporarily stored in the UL communication buffer 112 is sequentially transmitted to the 3G side. The control unit 140 asynchronously controls the data reception from the wireless LAN and the data transmission to 3G.

The first communication monitor unit 102 measures the volume of data transmitted to the 3G communication unit 132 from the UL communication buffer 112 and monitors the communication state of the 3G communication unit 132. The first communication monitor unit 102 in response with the inquiry of the data transmission state from the communication apparatus 12 via the wireless LAN communication unit 134, replies the data transmission state of the UL communication buffer 112 via the wireless LAN communication unit 134.

Further, the cellular phone 10 can either have the transmission state be displayed on the display unit 32, or have a notification sound or a voice message be notified from the speaker 36, or have it to end.

Data on the down link side is temporarily stored in the DL communication buffer 114 of the proxy function unit 100 via a 3G layer, an IP layer and a TCP layer of the 3G communication unit 132 contrary to the data on the uplink side. The DL communication buffer 114 is also in the FIFO-type, and a downloaded data temporarily stored in the DL communication buffer 114 is sequentially transmitted to the wireless LAN side.

The second communication monitor unit 104 monitors the volume of data transmitted to the wireless LAN communication unit 134 from the DL communication buffer 114 and the communication state of the wireless LAN communication unit 134. The second communication monitor unit 104 in response with the inquiry of the data transmission state from the communication apparatus 12 via the wireless LAN communication unit 134, replies the data transmission state of the DL communication buffer 114 via the wireless LAN communication unit 134. Further, in the cellular phone 10, the transmission state is displayed on the display unit 32, or a notification sound and a voice message is notified from the speaker 36, or have it to end.

Further, in the present exemplary embodiment, the communication state and the transmission state monitored by the first communication monitor unit 102 and the second communication monitor unit 104 are described for a case when being replied to an inquiry from the communication apparatus 12. However, operation of the first communication monitor unit 102 and the second communication monitor unit 104 is not limited hereto. For example, the first communication monitor unit 102 and the second communication monitor unit 104 can reply to an inquiry from other apparatus connected to either side of the 3G communication unit 132 and the wireless LAN communication unit 134 in a similar way. Further, the communication state and the transmission state, for example, may include sent and received data capacity, or its percentage or send and receive completion, the transmitted data capacity, or its percentage or transmission completion, send-receive error, a transmission error, retrying, or the like. The cellular phone 10 has the notification unit (not shown) that will notify the communication state and the transmission state to the user. For example, the cellular phone 10 may have the communication state and the transmission state be displayed on the display unit 32, or may have the speaker 36 to notify a notification sound and a voice message.

In the proxy function unit 100, the control unit 140 analyzes a packet of the uplink data transmitted from the communication apparatus 12 via a wireless LAN. Then, the control unit 140 registers the IP address of a sender and the destination included in a packet of the uplink data to the address management table 120. Further, the control unit 140 registers the port number of the sender and the destination included in a packet of the uplink data to the port number management table 122. Further, the control unit 140 stores the uplink data in the UL communication buffer 112. To the IP destination address of the uplink data stored in the UL communication buffer 112, the IP address of the cellular phone 10 is designated. The proxy function unit 100 changes the IP address and the port number which is the destination of the uplink data to the IP address and the port number of the forwarding destination of the uplink data and transmits to the 3G side. Here, the IP address and the port number of the forwarding destination of the uplink data are indicated on a data area of the uplink data. The transmission to the 3G communication unit 132 by the wireless LAN communication unit 134 is performed independent of the communication state of the wireless LAN.

Specifically, the communication apparatus 12 designates the IP address 192.168.0.254 of the cellular phone 10 and uploads image data to the cellular phone 10. The cellular phone 10 changes the destination address of image data to an IP address of the carrier server 14 from the IP address 192.168.0.254 of the cellular phone 10. Then, the cellular phone 10 connects with the carrier server 14 of the cellular phone network 6. As a result, the cellular phone 10 will be able to access the internet 8. Further, in the communication apparatus 12, because it is connected to the cellular phone 10 by designating the URL of the server 16, the cellular phone 10 accesses to the URL of the server 16 designated in the communication apparatus 12. Or more specifically, as another exemplary embodiment, the cellular phone 10 can change the URL of the server 16 designated by the communication apparatus 12 to another URL.

Figure 5:
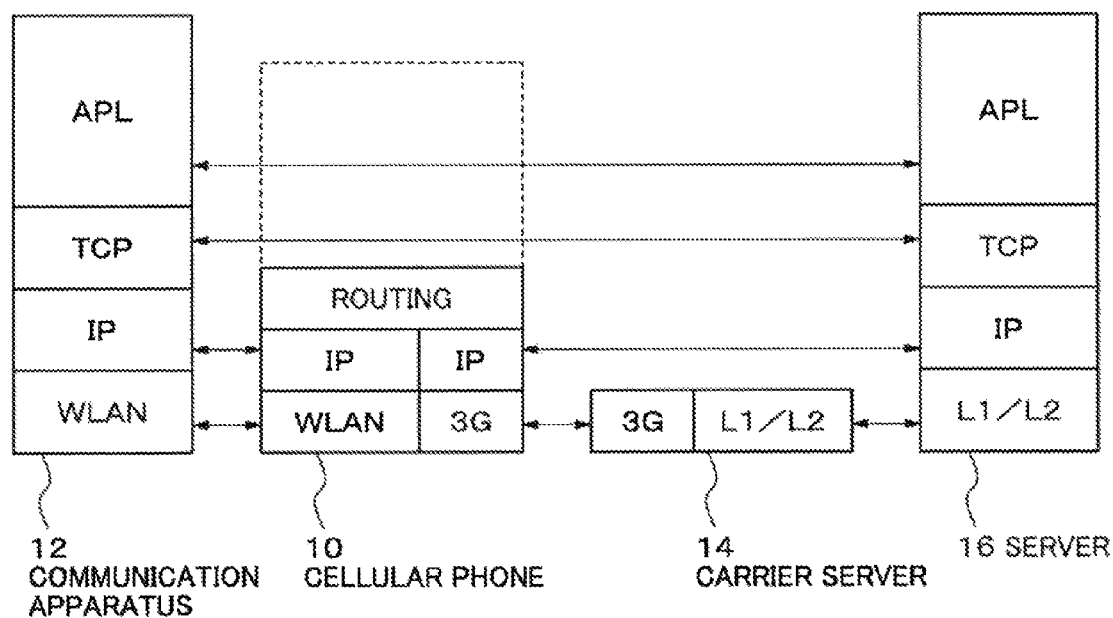
FIG. 5 It is a figure showing a general-purpose composition of the communication system and protocol stack.
Figure 6:
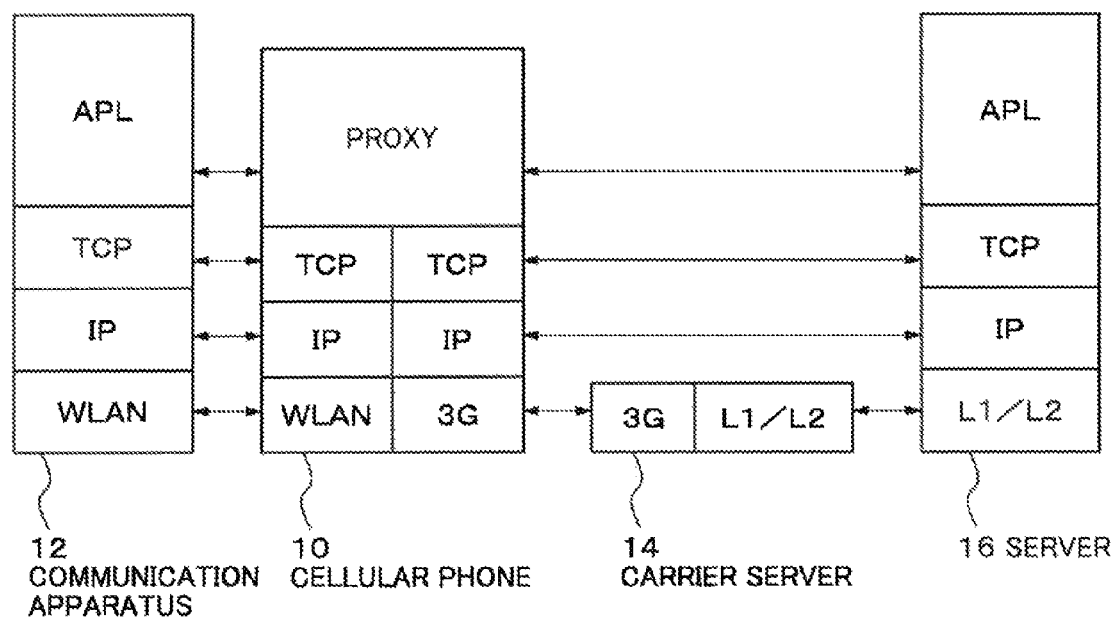
FIG. 6 It is a figure showing a composition and the protocol stack of the communication system according to the exemplary embodiment of the present invention.

FIG. 5 is a figure showing a general-purpose composition of the communication system and a protocol stack, and FIG. 6 is a figure showing a composition of the communication system and the protocol stack according to the exemplary embodiment of the present invention.

In a general-purpose communication system shown in FIG. 5, the cellular phone 10 has a routing function, and a session of a TCP is established between the communication apparatus 12 and the server 16. As a result, when data is transmitted to the server 16 from the communication apparatus 12, by the influence of the slow communication speed of the 3G, the data transmission speed from the communication apparatus 12 to the server 16 becomes slow, and the response speed from the server 16 to the communication apparatus 12 also becomes slow. In contrast, in the communication system of the present exemplary embodiment, as shown in FIG. 6, the/cellular phone 10 has the proxy function mentioned above, and a session of a TCP is terminated in the cellular phone 10. Then, a TCP session is established independently in each of between the communication apparatus 12 and the cellular phone 10, and between the cellular phone 10 and the server 16. As a result, the communication system of the present exemplary embodiment can finish a session between the communication apparatus 12 and the cellular phone 10 fast, based on a wireless LAN communication with a fast communication speed.

The various functions of each above-mentioned unit of the cellular phone 10 are realized by having the CPU 22 of the cellular phone 10 to execute a computer program. A control program of the cellular phone 10 of the present exemplary embodiment is described as to have a computer to execute a first communication procedure by connecting to the server 16 on the internet 8 and a second communication procedure which performs data communication by connecting to the communication apparatus 12. Then, the control program of the cellular phone 10, in the first communication procedure and in the second communication procedure, when relaying communication of data between the server 16 and the communication apparatus 12, it is described as to execute a temporary storage procedure to temporarily store data to the temporary storage unit 110. Further, the control program of the cellular phone 10, when relaying data between the server 16 and the communication apparatus 12, it is described as to execute a control procedure to control data communication in the first communication procedure and in the second communication procedure asynchronously and in parallel.

The computer program of the present exemplary embodiment may be stored in a computer-readable storage medium.

Figure 7:
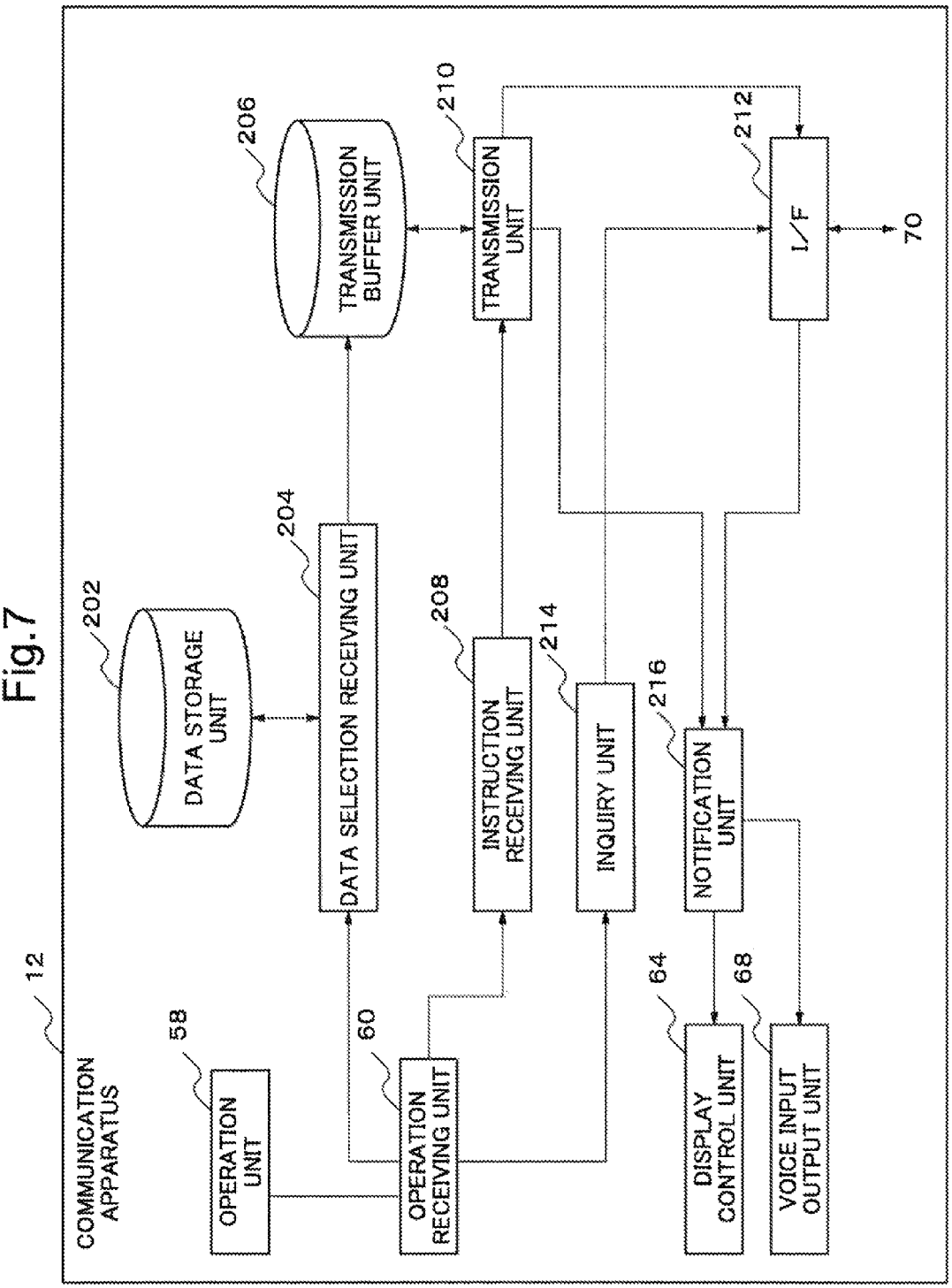
FIG. 7 It is a functional block diagram showing a main section composition of the communication apparatus of the communication system of the present exemplary embodiment.

FIG. 7 is a functional block diagram showing a main section composition of the communication apparatus 12 of the communication system of the present exemplary embodiment.

The communication apparatus 12 of the present exemplary embodiment includes a communication unit (an interface unit 212), a request unit (a transmission unit 210), a control unit (a transmission unit 210), an inquiry unit 214, a receiving unit (a notification unit 216), and a presentation unit (a notification unit 216, a display unit 62, and a speaker 66).

The communication unit (the interface unit 212) connects with the server 16 on the internet 8 via the cellular phone 10 and communicates with the server 16. The request unit (the transmission unit 210) requests data communication with the server 16 to the cellular phone 10. The control unit (the transmission unit 210) makes the cellular phone 10 to have data communication via the interface unit 212. The inquiry unit 214 inquires the communication state of the data communication with the server 16 to the cellular phone 10. The receiving unit (the notification unit 216) receives the communication state from the cellular phone 10. The presentation unit (the notification unit 216, the display unit 62, and the speaker 66) presents the received communication state.

As shown in FIG. 7, the communication apparatus 12 of the present exemplary embodiment further includes a data storage unit 202, a data selection receiving unit 204, a transmission buffer unit 206, and an instruction receiving unit 208.

Here, the CPU 52 described in FIG. 3 realizes the function of the data storage unit 202, the data selection receiving unit 204, the transmission buffer unit 206, the instruction receiving unit 208, the transmission unit 210, the inquiry unit 214 and the notification unit 216 in FIG. 7 according to a program. That is, the CPU 52, according to the program, reads and writes data to and from the ROM 54 and the RAM 56, further realizes the function of each units by sending and receiving a stored data between the hardware blocks via the bus 76.

Further, in the present exemplary embodiment, the case of uploading image data captured by the communication apparatus 12 to the server 16 from the communication apparatus 12 will be described as an example. However, data can be downloaded in the communication apparatus 12 from the server 16. Then, the communication apparatus 12 may include a receiving unit (not shown) which receives designated data via the interface unit 212 from the server 16, and a receiving buffer (not shown) which temporarily stores received data.

The data storage unit 202, for example, stores image data captured in the image capturing unit 74 (FIG. 3) of the communication apparatus 12. The data selection receiving unit 204 receives a designation of image data transmitted to the server 16 which was selected from image data stored in the data storage unit 202. The user can operate an operation unit 58 according to an operation screen (not shown) shown to the display unit 62 (FIG. 3), and selects at least one of image data and designate it. The operation receiving unit 60 receives operation of the operation unit 58 and notifies image data by which selected and designated by the data selection receiving unit 204. Then, the data selection receiving unit 204 reads the selected and designated image data from the data storage unit 202 and temporarily stores in the transmission buffer unit 206.

The instruction receiving unit 208 receives an instruction to start transmission of image data for selected upload to the server 16. The user can instruct on the transmission starting by operating the operation unit 58 according to an operation screen (not shown) shown to the display unit 62 (FIG. 3). The operation receiving unit 60 receives operation of the operation unit 58, and notifies the transmission starting instruction to the instruction receiving unit 208.

The transmission unit 210, according to the instruction which the instruction receiving unit 208 received, transmits image data stored in the transmission buffer unit 206 to the cellular phone 10 via the interface unit 212. Further, the transmission unit 210 determines whether or not data transmission to the cellular phone 10 is completed, and when the data transmission is completed, the transmission unit 210 notifies to the notification unit 216.

The interface unit 212 connects with the cellular phone 10 by the wireless LAN unit 70 and performs wireless communication. The inquiry unit 214, when inquiry instructions of the upload state of the image data to the server 16 are received, or periodically, the inquiry unit 214 inquires the cellular phone 10 the upload state to the server 16 via the interface unit 212. The user can operate the operation unit 58 according to an operation screen (not shown) shown to the display unit 62 (FIG. 3), and can make instruction on inquiry of the upload state. The operation receiving unit 60 receives operation of the operation unit 58, and notifies the inquiry instructions of the upload state to the instruction receiving unit 208.

The notification unit 216 receives the upload state to the server 16 that the inquiry unit 214 inquired via the interface unit 212 from the cellular phone 10, and instructs the display control unit 64 to display the result to the display unit 62 on the screen. Or more specifically, the notification unit 216 instructs the voice input output unit 68 to output a notification sound or a voice message from the speaker 66. Further, the notification unit 216, on receiving a notification of data transmission completion to the cellular phone 10 from the transmission unit 210, instructs the display control unit 64 to display the data sending completion notice in the display unit 62. Or more specifically, the notification unit 216 instructs the voice input output unit 68 to output a notification sound or a voice message from the speaker 66.

The interface unit 212 is supposed to have separately a port for data transmission to the cellular phone 10 by the transmission unit 210 and a port for an inquiry of the data transmission state to the cellular phone 10 by the inquiry unit 214 and the notification unit 216 and for the reply reception thereof. According to the present exemplary embodiment, the port number of the port for data transmission of the communication apparatus 12 is 1024, and the port number of the inquiry of the data transmission state and for the reply reception is 1025.

The various functions of each of the above-mentioned units of the communication apparatus 12 may be realized by the CPU 52 of the communication apparatus 12 by executing a computer program. The control program of the communication apparatus 12 of the present exemplary embodiment is written for a computer to execute a communication procedure to perform communication by connecting to the server 16 on the internet 8 via the cellular phone 10. The control program of the communication apparatus 12, is further written to have the cellular phone 10 to carry out a request procedure to request data communication with the server 16. The control program of the communication apparatus 12 is further written to for the cellular phone 10 to carry out a control procedure to carry out data communication in the communication procedure, and an inquiry procedure to the cellular phone 10 to inquire the communication state of data communication with the server 16. Further, the control program of the communication apparatus 12 is written to execute a reception procedure to receive the communication state from the cellular phone 10 and a presentation procedure to present the received communication state.

A computer program of the present exemplary embodiment may be stored in a computer-readable storage medium.

Thus, operation of the communication system of the present exemplary embodiment with such composition will be described below.

Figure 8:
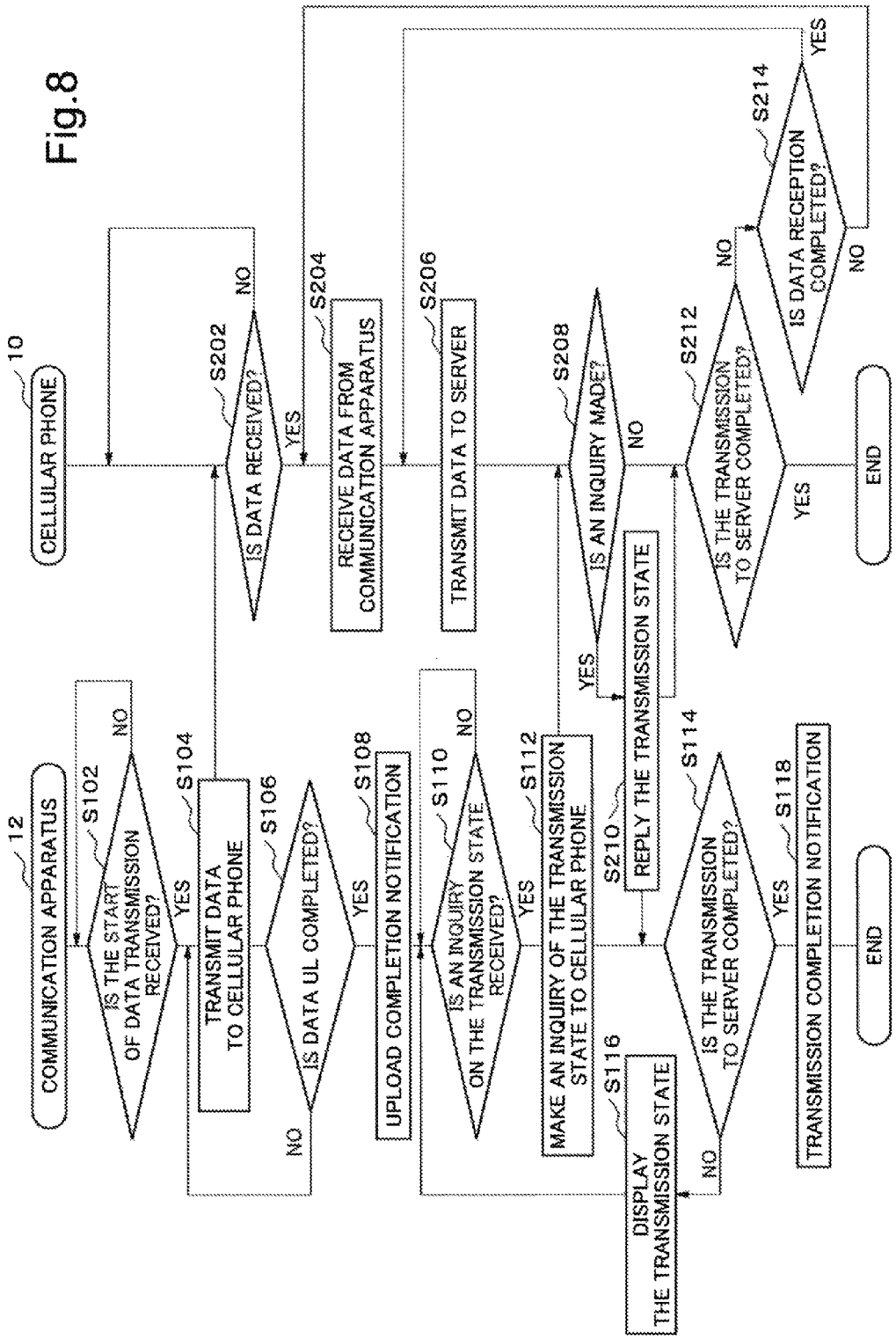
FIG. 8 It is a flowchart showing an example of operation of the communication system of the present exemplary embodiment.
Figure 9:
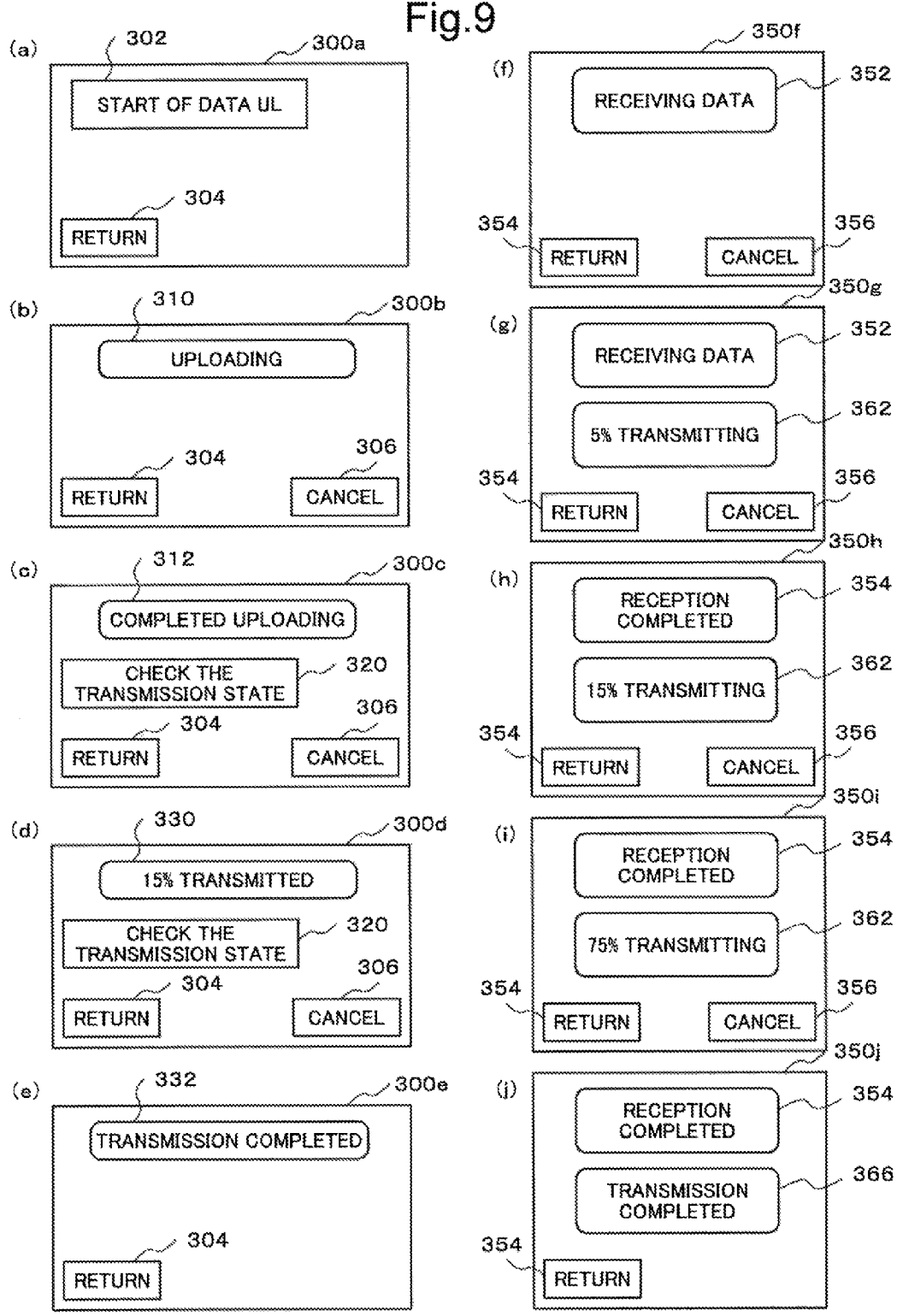
FIG. 9 It is a figure showing an example on a display of each apparatus of the communication system of the present exemplary embodiment.
Figure 10:
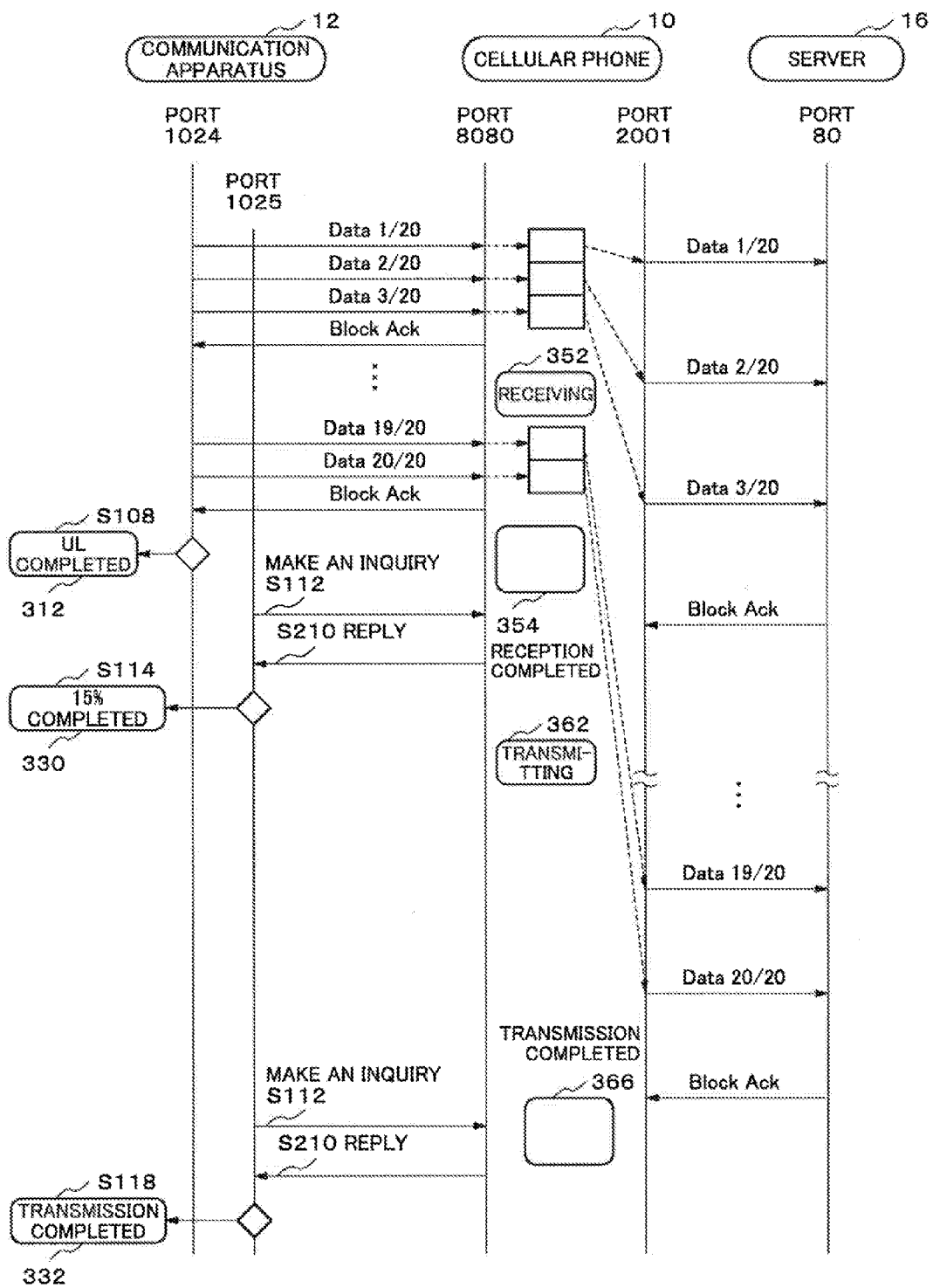
FIG. 10 It is a figure showing an example of upload sequence of the communication system of the present exemplary embodiment.

FIG. 8 is a flowchart showing an example of operation of the communication system of the present exemplary embodiment. FIG. 9 is a figure showing an example on a display of each apparatus of the communication system of the present exemplary embodiment. FIG. 10 is a figure showing an example of upload sequence of the communication system of the present exemplary embodiment. Hereinafter, description will be made using FIG. 1 to FIG. 10.

In a control method of the cellular phone 10 of the present exemplary embodiment, the cellular phone 10 relays data communication between the server 16 and the communication apparatus 12 using the 3G communication unit 132 and the wireless LAN communication unit 134. In this case, the cellular phone 10 temporarily stores data received from the communication apparatus 12 in the temporary storage unit 110 (Step S204 of FIG. 8). Then, the 3G communication unit 132 sequentially transmits image data stored in the temporary storage unit 110 to the server 16 (Step S206 of FIG. 8). Here, the cellular phone 10, when relaying data communication between the server 16 and the communication apparatus 12 via the temporary storage unit 110, may perform data communication between the 3G communication unit 132 and the wireless LAN communication unit 134 asynchronously and in parallel. That is, the cellular phone 10 may perform Steps S204 and S206 of FIG. 8 asynchronously and in parallel.

In a control method of the communication apparatus 12 of the present exemplary embodiment, the communication apparatus 12 requests data communication with the server 16 to the cellular phone 10 (Step S104 of FIG. 8). Then, the communication apparatus 12 makes the cellular phone 10 to carry out data communication of data transmitted from the interface unit 212 of the communication apparatus 12 (Step S104 of FIG. 8). Further, the communication apparatus 12, to the cellular phone 10, inquires the communication state of the data communication with the server 16 (Step S112 of FIG. 8), receives the communication state from the cellular phone 10, and displays the received communication state (Step S116 of FIG. 8).

Here, in the communication apparatus 12, image data to be transmitted to the server 16 is selected by the user, and it is supposed that image data is read from the data storage unit 202 and temporarily stored in the transmission buffer unit 206 by the data selection receiving unit 204. Then, to the display unit 62 of the communication apparatus 12, a screen 300*a* of FIG. 9 (*a*) is shown. Further, it is not always necessary to display each notification screen displayed to the display unit 32 of the cellular phone 10 and the display unit 62 of the communication apparatus 12 or the notification by a voice output, and whether or not to display depends on the user's request or on the setup in advance, and the selection may be made as needed. Further, each screen or the message indicated on each screen is not limited hereto, and an icon, an image or a mark may be displayed on each display according to the situation and it may be notified of by displaying an LED indicator by the predetermined color and luminous operation. Or, it may be notified of by vibration operation by a vibrating unit which is not illustrated. Such procedures can be combined freely and the procedure can be set by the user.

Further, in the communication apparatus 12, URL of the server 16 may be designated in advance, or the user may input as needed or may select from a list, or the procedure may be set by the user.

At below, in the communication apparatus 12, a case in which the user uses a pointing device such as a mouse is used as the operation unit 58 is explained as an example. When the user operates a data UL start button 302 displayed on the screen 300*a* using the operation unit 58 such as a mouse, the instruction receiving unit 208 receives data transmission starting instruction via the operation receiving unit 60 (YES of Step S102 of FIG. 8). Then the transmission unit 210 transmits image data stored in the transmission buffer unit 206 to the cellular phone 10 by the wireless LAN unit 70 via the interface unit 212 (Step S104 of FIG. 8). At that time, the communication apparatus 12 designates URL of the server 16 and connects with the cellular phone 10.

In FIG. 10, the case in which image data to be transmitted is composed of 20 frames of Data1/20-20/20 is indicated. Further, in the communication system of the present exemplary embodiment, it is supposed that both of communication in the wireless LAN side and the 3G side are receiving Block Ack (Block Acknowledgement) after the reception of every three frames and all frames.

In the cellular phone 10, the wireless LAN communication unit 134 sequentially receives image data from the communication apparatus 12, and it is temporarily stored in the UL communication buffer 112 (YES of Step S202 and S204 of FIG. 8). At that time, in the communication apparatus 12, the upload situation 310 is displayed on a screen 300b of FIG. 9 (b) in the display unit 62. Further, in the cellular phone 10, a reception state 352 is displayed on a screen 350f of FIG. 9 (f) in the display unit 32.

A flow of steps from S104 to S202 and S204 of FIG. 8 indicates a procedure by which image data is transmitted to the cellular phone 10 from the communication apparatus 12. The cellular phone 10, on receiving data from the communication apparatus 12 (Step S204 of FIG. 8), by the 3G communication unit 132, sequentially transmits image data which is temporarily stored in the UL communication buffer 112 from the communication apparatus 12 to the server 16 designated by URL (Step S206 of FIG. 8). At that time, to the display unit 32 of the cellular phone 10, a transmission state 362 is further displayed on a screen 350g of FIG. 9 (g).

As shown in FIG. 10, in the cellular phone 10, because the communication speed of the wireless LAN is faster compared with 3G, communication between the communication apparatus 12 and the cellular phone 10 completes in a short interval of time, and data accumulated in the UL communication buffer 112 of the cellular phone 10 is sequentially transmitted according to the communication speed of the 3G side.

The communication apparatus 12, when a transmission of image data to the cellular phone 10 has been completed (YES of Step S106 of FIG. 8), makes the notification unit 216 to notify the upload completion (Step S108 of FIG. 8). At that time, an upload completion notification 312 is displayed on a screen 300c of FIG. 9 (c) in the display unit 62 of the communication apparatus 12. As shown in the figure, to the screen 300c a transmission state confirmation button 320 is installed, and the user's instruction can be received. Further, to the display unit 32 of the cellular phone 10, a reception completion notification 354 is displayed on a screen 350h of FIG. 9 (h). Further, by not only a screen display but also a notification sound and a voice message, both of the cellular phone 10 and the communication apparatus 12 may notify the reception completion.

In the communication apparatus 12, when the user operates the transmission state confirmation button 320 of the screen 300c of FIG. 9 (c), the operation receiving unit 60 (FIG. 3) receives inquiry instructions (YES of Step S110 of FIG. 8), and the inquiry unit 214 (FIG. 7) inquires the transmission state to the cellular phone 10 via the interface unit 212 (Step S112 of FIG. 8). In the cellular phone 10, the first communication monitor unit 102 receives an inquiry from the communication apparatus 12 via the wireless LAN communication unit 134 (YES of Step S208 of FIG. 8). The first communication monitor unit 102 monitors the transmission state from the UL communication buffer 112 to the 3G side. In response with the inquiry, the first communication monitor unit 102 replies with the transmission state to the communication apparatus 12 (Step S210 of FIG. 8).

The communication apparatus 12 determines whether or not the notification unit 216 receives a reply from the cellular phone 10 via the interface unit 212 and the transmission to the server 16 in the cellular phone 10 is completed (Step S114 of FIG. 8). While the transmission is not completed (NO of Step S114 of FIG. 8), a screen 300d of FIG. 9 (d) is displayed to the display unit 62 of the communication apparatus 12, and a transmission state 330 is displayed (Step S116 of FIG. 8). At that time, at the display unit 32 of the cellular phone 10, a transmission state 362 may be displayed on a screen 350h and a screen 350i on FIG. 9 (h) and FIG. 9 (i). The communication apparatus 12, until the transmission to the server 16 in the cellular phone 10 is completed (NO of Step S114 of FIG. 8), after Step S116, returns to Step S110 and receives an inquiry of the transmission state from the user at any time.

However, in the middle of the above-mentioned flow, when communication is stopped by the user's instruction, for example, by the operation of a cancel button 306 and a cancel button 356, both the cellular phone 10 and the communication apparatus 12 ends the process. Further, in a flow after Step S110 of the communication apparatus 12, when the user operates a return button 304 on each screen 300 of FIG. 9 or after the predetermined time elapsed under the power saving mode of the screen display, the display on the screen 300 may be stopped and the process may be ended. In a flow after Step S110 of the communication apparatus 12, by the user's instructions, it may return to the screen 300 when needed and perform an inquiry and a display of the transmission state. Further, after communication between the cellular phone 10 has stopped by deterioration of a communication environment and the like, the communication apparatus 12 may re-try and continue communication between the cellular phone 10 when the communication environment becomes good. Or more specifically, the communication apparatus 12 may notify the communication error to the user and start over communication by the user's instructions.

In the cellular phone 10, as shown in FIG. 10, the 3G communication unit 132 sequentially transmits a data frame to the server 16. Then when the 3G communication unit 132 transmits the last frame Data20/20 to the server 16 and receives Ack from the server 16, the first communication monitor unit 102 determines that transmission to the server 16 has been completed (YES of Step S212 of FIG. 8) and ends the process hereof.

Further, at that time, a transmission completion notification 366 is displayed on a screen 350j of FIG. 9 (j) in the display unit 32 of the cellular phone 10. Further, in the cellular phone 10, until the reception of image data from the communication apparatus 12 is completed (NO of Step S214 of FIG. 8), until the transmission to the server 16 is completed (NO of Step S212 of FIG. 8) it returns to Step S204, and when the reception of image data from the communication apparatus 12 is completed (YES of Step S214 of FIG. 8) it is returned to Step S206.

After data transmission from the cellular phone 10 to the server 16 is completed, in the communication apparatus 12, when the user operates the transmission state confirmation button 320 of the screen 300, the operation receiving unit 60 receives a transmission state inquiry (YES of Step S110 of FIG. 8) as mentioned above. Then the inquiry unit 214 inquires the transmission state of the cellular phone 10 (Step S112 of FIG. 8). After transmission to the server 16 is completed (YES of Step S114 of FIG. 8), at the display unit 62 of the communication apparatus 12, a transmission completion 332 is displayed on a screen 300e of FIG. 9 (e) (Step S118 of FIG. 8).

Contrary to the processing at the time of the above-mentioned upload, when data is downloaded via the cellular phone 10 in the communication apparatus 12 from the server 16, compared with the speed between the cellular phone 10 and the communication apparatus 12, the communication speed between the server 16 and the cellular phone 10 is slower. For this reason, the cellular phone 10 may transmit to the communication apparatus 12 from the server 16 whenever a frame is received. Or more specifically, the cellular phone 10 may repeat to buffer the plurality of received frame data at the constant capacity or up to the predetermined number of frames of the DL communication buffer 114 and transmit to the communication apparatus 12. Or more specifically, when the DL communication buffer 114 of the cellular phone 10 has a larger capacity than the received data, after receiving all frames from the server 16, it may notify the communication apparatus 12 and transmit to the communication apparatus 12 in one lump according to the request from the communication apparatus 12.

As it has been described above, the communication system of the exemplary embodiment of the present invention, by having the proxy function unit 100 in the cellular phone 10, a session of a wireless LAN communication and 3G communication which are the different communication units can be separated, and these sessions can be controlled separately. Accordingly, the communication system of the exemplary embodiment of the present invention, when data is relayed in the cellular phone 10, communication can be performed independently without being influenced by the communication state of the different communication unit with each other. As a result, the communication system of the exemplary embodiment of the present invention, when communication with an external communication apparatus and communication with a server via a portable terminal apparatus are performed by different communication interface respectively, reduces the waiting time and has the effect that data transmission at a higher speed is possible. According to the above-mentioned exemplary embodiment, the communication apparatus, when transmission of data by a wireless LAN is completed to the cellular phone 10, even if transmission of uploaded data to the server 16 is not completed, can complete upload processing of data in a short interval of time. For this reason, the user can begin a different process, and convenience improves. Further, on the upload situation to the server 16, the user is able to know by acquiring information and notifying from the cellular phone 10.

Further, in the cellular phone 10 shown in FIG. 4, the minimum configuration equipped with the 3G communication unit 132, the wireless LAN communication unit 134, the temporary storage unit 110, and the control unit 140 also has the effect that an efficient communication is possible. That is, it is possible to have a configuration of the 3G communication unit 132 and the wireless LAN communication unit 134 so that the 3G communication unit 132 connects with a server on the network as the first communication means and communicates data, and may connect with a communication apparatus as the second communication means and communicate data. Further, the temporary storage unit 110, using the first communication means and the second communication means, when communication of data between the server and the communication apparatus is relayed, temporarily stores data. Further, the control unit, when the cellular phone 10 relays communication of data via the temporary storage unit 110 between the server and the communication apparatus, controls data communication of the first communication means and the second communication means asynchronously and in parallel.

The communication system with the minimum configuration of the present exemplary embodiment constituted as above, when data is relayed in the cellular phone 10, has an effect of having an efficient communication by performing communication independently without being influenced by the communication state of the different communication unit.

Although the exemplary embodiment of the present invention was described with reference to the drawings above, these are the illustration of the present invention and other than those above various composition can be adopted.

According to the above-mentioned exemplary embodiment, while a wireless LAN communication is used between the cellular phone 10 and the communication apparatus 12, and the communication interface with the faster communication speed than between the cellular phone 10 and the server 16 is used, it is not limited hereto. For example, between the cellular phone 10 and the communication apparatus 12, a communication interface with the slower communication speed than between the cellular phone 10 and the server 16 such as Bluetooth can be used.

Figure 11:
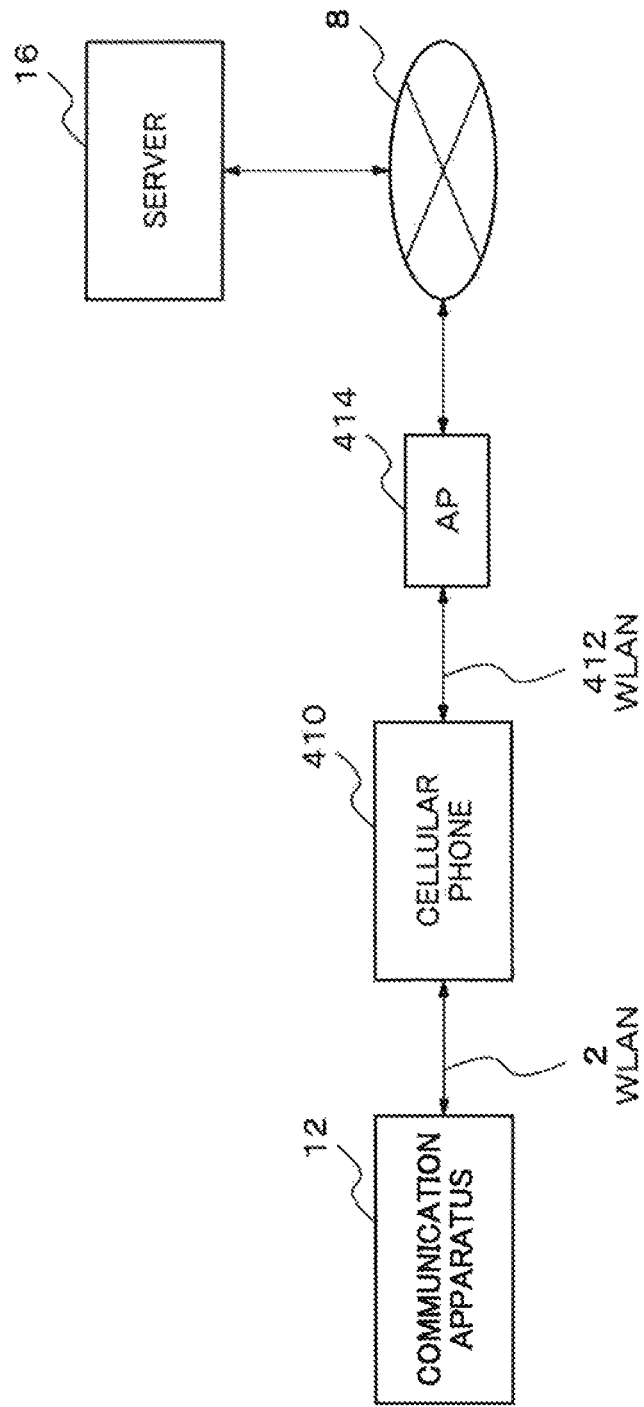
FIG. 11 It is a figure showing another example of a composition of the communication system according to the exemplary embodiment of the present invention.

According to the above-mentioned exemplary embodiment, although the cellular phone 10 was exemplified as a portable terminal apparatus of the present invention, and the cellular phone 10 had a configuration which connects with the cellular phone network 6 via the cellular phone line 4 and connects with the internet 8 via the carrier server 14, it is not limited hereto. For example, as shown in FIG. 11, a portable terminal apparatus may be an IP telephone 410, and may have a configuration which connects directly with the internet 8. In this case, the IP telephone 410 has two wireless LAN communication interface units (not shown). Further, the IP telephone 410 uses one wireless LAN communication interface unit for communication with the communication apparatus 12, and can use the other for communication with the server 16 on the internet 8 via an access point (AP: Access Point) 414 such as a broadband router. Again, in this case, communication with the server 16 on the internet 8 has a bad communication state compared with communication with the communication apparatus 12. Since the radio wave state, for example, between the access point 414 and the IP telephone 410 being bad or unstable, there is a possibility of communication state deteriorating and the communication speed becoming slow. Further, depending on the processing speed of the server 16 and congestion of the internet 8, there is a high possibility that the communication speed becomes slow. When in such bad communication state, by applying the communication system of the present invention, it is possible not to have an influence of the communication state of the server 16 side on operation of the communication apparatus 12.

Further, the portable terminal apparatus in the above-mentioned exemplary embodiment is not limited to a portable terminal apparatus which can be carried around. Further, it is obvious that the similar effect can be obtained by a similar operation of the above-mentioned exemplary embodiment when a terminal apparatus has a configuration which connects to a general phone line and a telephone network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, any combination of the component elements of the above mentioned exemplary embodiment and conversion of the expression of the present invention between a method, an apparatus, a system, a recording medium, and a computer program and the like, are also effective as a mode of the exemplary embodiment of the present invention.

Further, various components in the above mentioned embodiment do not necessarily need to be the independent existence individually. A plurality of components may be formed as one member. One component element may be formed by a plurality of members. One component may be formed as a part of another component element. A part of a certain component element and a part of another component element may overlap, and the like.

Further, although a plurality of procedures have been indicated on the method and the computer program in the above mentioned exemplary embodiment in turn, the order of the description does not limit order which carries out a plurality of procedures. For this reason, when the method and the computer program indicated on the above mentioned exemplary embodiment are put into effect, the order of the plurality of procedures can be modified within the scope of the content.

Further, the method and the computer program in the above mentioned exemplary embodiment, it is not limited to process being carried out at a different timing. For this reason, another procedure may occur during execution of a certain procedure, or a part or all parts of the execution timing of a certain procedure and the execution timing of another procedure may overlap.

Further, when information about the user is acquired and used in the present invention, it is supposed that this is performed legitimately.

This application is based upon and claims the benefit of priority from Japanese Patent Application No. 2009-137659, filed on Jun. 8, 2009, the disclosure of which is incorporated herein in its entirety by reference.

DESCRIPTION OF CODES 2 wireless LAN
4 cellular phone line
6 cellular phone network
8 internet
10 cellular phone
12 communication apparatus
14 carrier server
16 server
22 and 52 CPU
24 and 54 ROM
26 and 56 RAM
28 and 58 operation unit
30 and 60 operation receiving unit
32 and 62 display unit
34 and 64 display control unit
36 and 66 speaker
38 and 68 voice input output unit
40 3G communication unit
42 antenna for 3G communications
44 and 70 wireless LAN (WLAN) unit
46 and 72 antenna for wireless LANs
48 and 76 bus
74 image capturing unit
100 proxy function unit
102 first communication monitor unit
104 second communication monitor unit
110 temporary storage unit
112 UL communication buffer
114 DL communication buffer
120 address management table
122 port number management table
132 3G communication unit
134 wireless LAN communication unit
140 control unit
202 data storage unit
204 data selection receiving unit
206 transmission buffer unit
208 instruction receiving unit
210 transmission unit
212 interface (I/F) unit
214 inquiry unit
216 notification unit
410 IP telephone
412 wireless LAN
414 access point (AP)

The invention claimed is:

1. A portable terminal apparatus comprising:
a first communication unit which is configured to connect to a server on a network and performs data transmission;
a second communication unit which is configured to connect said portable terminal apparatus to a communication apparatus external to the portable terminal apparatus using a wireless local area network (LAN), and which is configured to perform data transmission;
a temporary storage unit which, using said first communication unit and said second communication unit at the time of relaying a communication of data between said server and said communication apparatus, is configured to temporarily store said data; and
a control unit which is configured to control said data communication of said first communication unit and said second communication unit asynchronously and in parallel at the time of relaying the communication of data between said server and said communication apparatus,
wherein said control unit is configured to terminate said communication, and to configure said communication by one session between said server and said portable terminal apparatus and another session between said portable terminal apparatus and said communication apparatus.

2. The portable terminal apparatus according to claim 1, wherein
said control unit, after temporarily storing at least one part of data received from either of said first communication unit or said second communication unit in said temporary storage unit, transmits said temporarily stored data in said temporarily storage unit by the other communication unit in parallel with continuing the reception of said data.

3. The portable terminal apparatus according to claim 1, wherein the communication speed of said first communication unit is different from that of said second communication unit.

4. The portable terminal apparatus according to claim 1, wherein said first communication unit performs mobile telephone communication via a cellular phone network, and connects with said network.

5. The portable terminal apparatus according to claim 1, wherein said first communication unit performs a wireless LAN communication via an access point, and connects with said network.

6. The portable terminal apparatus according to claim 1, wherein said second communication unit performs a wireless LAN communication.

7. The portable terminal apparatus according to claim 1, wherein said second communication unit performs Bluetooth (registered trademark) communication.

8. The portable terminal apparatus according to claim 1, further comprising a monitoring unit which monitors a communication state of said first communication unit and that of said second communication unit respectively,
wherein said control unit independently controls said data communication of said first communication unit and said second communication unit according to said communication state.

9. The portable terminal apparatus according to claim 8, further comprising an informing unit which informs said communication state to the user.

10. The portable terminal apparatus according to claim 8, further comprising a notifying unit which notifies said communication state to said server or said communication apparatus.

11. The portable terminal apparatus according to claim 10, further comprising a receiving unit which receives an inquiry of said communication state from said server or said communication apparatus,
wherein said notifying unit replies to said inquiry which said reception unit received and notifies said communication state to said server or said communication apparatus.

12. The portable terminal apparatus according to claim 1, wherein said first communication unit receives a connection request from said communication apparatus to said server, and connects with said connection requested server.

13. A communication system comprising:
a portable terminal apparatus; and
communication apparatus;
wherein said portable terminal apparatus comprises:
a first communication unit which is configured to connect to a server on a network and performs data transmission;
a second communication unit which is configured to connect to said portable terminal apparatus to a communication apparatus external to the portable terminal apparatus using a wireless local area network (LAN) and performs data transmission;
a temporary storage unit which, using said first communication unit and said second communication unit at the time of relaying a communication of data between said server and said communication apparatus, is configured to temporarily store said data; and
a control unit which is configured to control said data communication of said first communication unit and said second communication unit asynchronously and in parallel at the time of relaying the communication of data between said server and said communication apparatus,
wherein said portable terminal apparatus is configured to relay the communication of data between said communication apparatus and said server,
wherein said control unit is configured to terminate said communication, and configure said communication by one session between said server and said portable terminal apparatus and another session between said portable terminal apparatus and said communication apparatus.

14. A control method of a portable terminal apparatus including a first communication unit that connects with a server on the network and performs data communication, a second communication unit that connects with a communication apparatus external to the portable terminal apparatus using a wireless local area network (LAN) and performs data communication, and a temporary storage unit, comprising:
storing said data in said temporary storage unit when relaying communication of data between said server and said communication apparatus by using said first communication unit and second communication unit;
controlling said data communication of said first communication unit and said second communication unit asynchronously and in parallel when relaying communication of data between said server and said communication apparatus,
terminating said communication; and
configuring said communication by one session between said server and said portable terminal apparatus and another session between said portable terminal apparatus and said communication apparatus,
wherein said portable terminal apparatus is carried with said communication apparatus by a user of said portable terminal apparatus.

15. A non-transitory computer-readable recording medium in which a control program of a portable terminal apparatus is recorded, wherein the control program makes the computer of the portable terminal apparatus execute process comprising:
a first communication procedure which connects with a server on a network and performs data communication;
a second communication procedure which connects said portable terminal apparatus to a communication apparatus external to the portable terminal apparatus using a wireless local area network (LAN) and performs data communication;
a temporary storage procedure which, when relaying communication of data between said server and said communication apparatus in said first communication procedure and said second communication procedure, temporary stores said data in said temporary storage unit;
a control procedure which controls, when relaying communication of data between said server and said communication apparatus, said data communication in said first communication procedure and said second communication procedure asynchronously and in parallel; and
a control procedure which terminates said communication, and configures said communication by one session between said server and said portable terminal apparatus, and another session between said portable terminal apparatus and said communication apparatus.

16. A portable terminal apparatus comprising:
a first communication means which is configured to connect to a server on a network and performs data transmission;
a second communication means which is configured to connect said portable terminal apparatus to a communication apparatus external to the portable terminal apparatus using a wireless local area network (LAN) and which performs data transmission;
a temporary storage means which, using said first communication means and said second communication means at the time of relaying a communication of data between said server and said communication apparatus, is configured to temporarily store said data; and
a control means which is configured to control said data communication of said first communication means and said second communication means asynchronously and in parallel at the time of relaying the communication of data between said server and said communication apparatus,
wherein said control unit is configured to ter terminate said communication, and configure said communication by one session between said server and said portable terminal apparatus and another session between said portable terminal apparatus and said communication apparatus.

* * * * *